Dec. 4, 1951  J. W. WHITE, JR  2,577,555
AUTOMATIC FISHING REEL
Filed July 12, 1949  2 SHEETS—SHEET 2
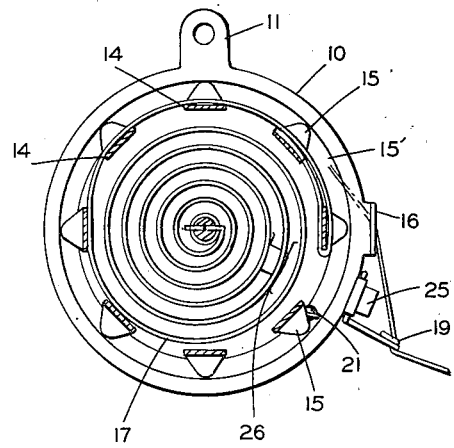
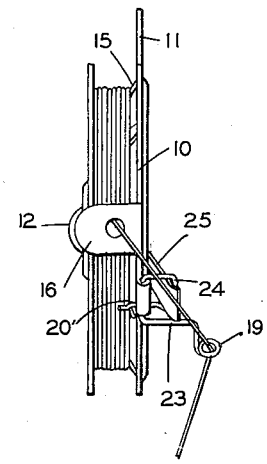
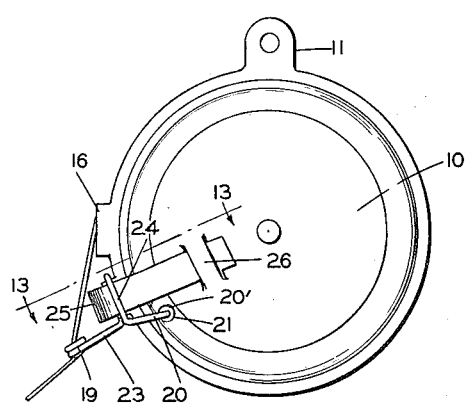
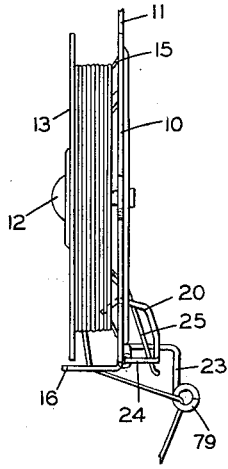
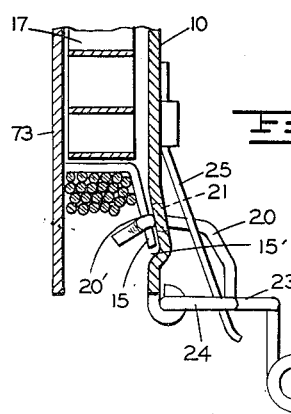
*INVENTOR.*
JOHN W. WHITE JR.
BY
*Cushman Darby Cushman*
ATTORNEYS Patented Dec. 4, 1951

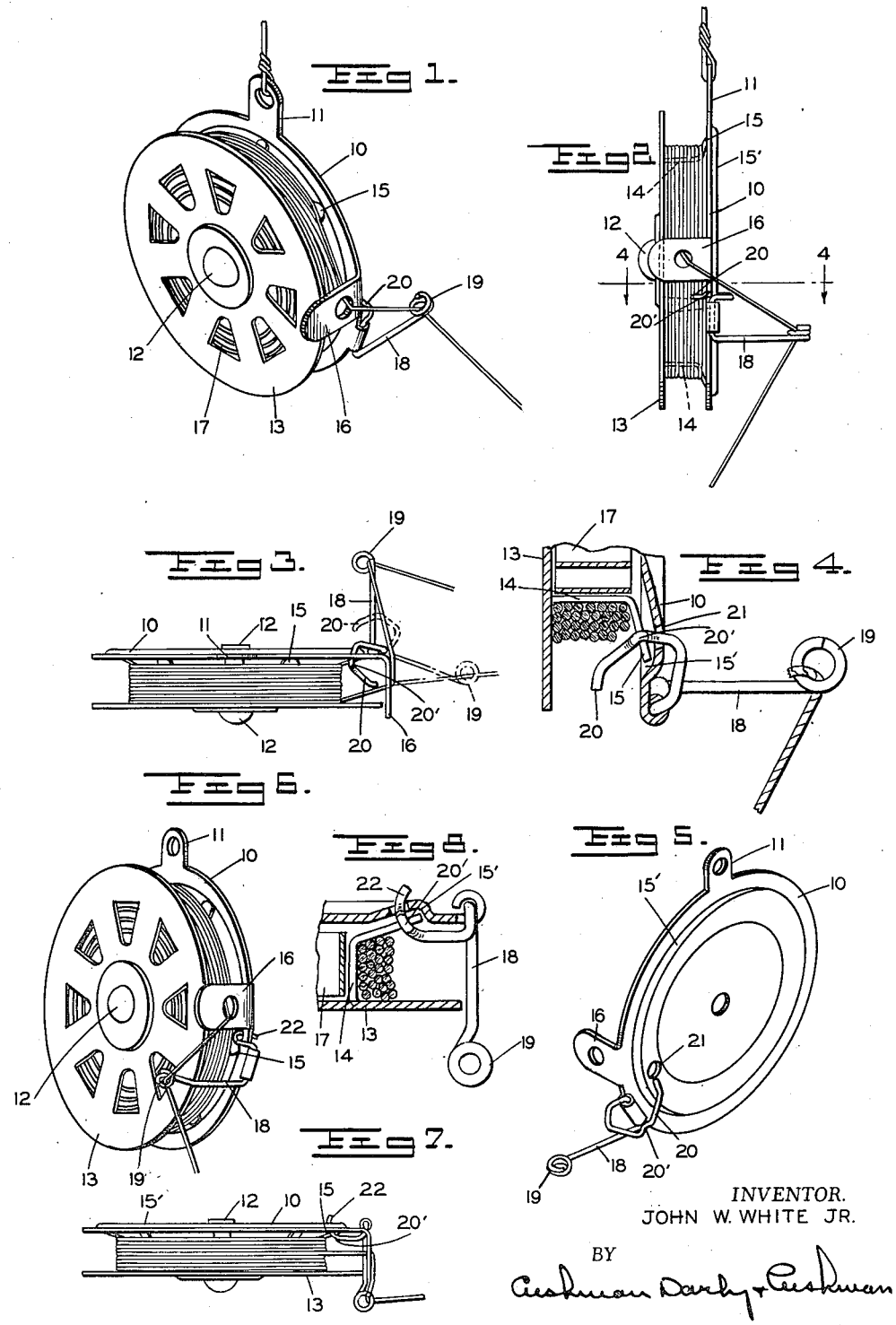

2,577,555

UNITED STATES PATENT OFFICE 2,577,555

AUTOMATIC FISHING REEL

John W. White, Jr., Little Rock, Ark.

Application July 12, 1949, Serial No. 104,177

4 Claims. (Cl. 242—109)

The present invention has to do with fishing reels. It has for its purpose the provision of a spring-actuated, line-tripped reel, which, on pull of a hooked fish on the line, will trip a reel-restraining trigger, release the reel, and permit the reel-actuating spring to rotate the reel and pull in the hooked fish.

Particularly, it has for its object a novel form of line-tripped trigger which normally holds the reel against reeling-in action by the spring, but which, on pull on the line by a hooked fish, will release the reel and permit reeling-in action by the spring.

In the drawings herewith forming part of this disclosure:

Figure 1 is a section in perspective of a reel embodying the invention.

Figure 2 is a view in side elevation of the reel shown in Fig. 1.

Figure 3 is a view in plan of the reel, the trigger being shown in full and dotted line positions.

Figure 4 is an enlarged detail of a portion of the reel showing the trigger in reel-holding position.

Figure 5 is a view in perspective of the housing or supporting plate of the reel.

Figure 6 is a view in prespective of a reel showing a slightly different arrangement of the trigger.

Figure 7 is a top plan view of the reel shown in Fig. 6.

Figure 8 is an enlarged detail of the trigger shown in Figs. 6 and 7.

Figure 9 is a view in side elevation showing a reel having a spring-actuated trigger and showing the continuous spring having differently tensioned sections.

Figure 10 is a view in side elevation of the reel shown in Fig. 9.

Figure 11 is a view of the reverse side of the reel.

Figure 12 is a view in top plan of the reel shown in Fig. 9.

Figure 13 is an enlarged detail to illustrate the trigger action taken on substantially the line 13—13 of Fig. 11.

Referring to the drawings by numbers, like numbers indicating like parts in the several views, 10 indicates the reel supporting plate which preferably has a hanger 11 by which it may be suspended from any suitable support, although the reel may be mounted in any other suitable manner. Mounted on the supporting plate 10 is an arbor 12 on which a line-carrying reel member 13 is revolubly mounted, the line being carried by projecting fingers 14 preferably struck from the reel plate 15 and integral therewith. The line-carrying fingers 14 have upturned ends 15 which hold the line in place on the reel and these ends preferably run in a groove 15' in the supporting plate 10. The supporting plate 10 carries a fixed line guide 16 through which the line runs from the reel.

Fixed to the arbor 12 at its inner end is a continuous spring 17, the outer end of which is engaged with the reel 13 preferably by being secured to one or more of the line-carrying arms 15 so as to exert a constant pull on the reel when the spring is placed under tension and tend to reel in the line when the reel is released in a manner hereinafter described. The spring 17 is continuous but is tempered at different degrees of tension. The inner end of spring 17 which is attached to the arbor is tempered through the desired proportion of its length to give a lighter tension than the outer section so as to give a lighter pull on the line than does the outer section of the spring. The result of this is that when the spring starts its reeling action there will be a stronger and faster reeling-in action so as to set the hook in the catch while the inner section of the spring of less tension will give an easier pull as the reeling-in action approaches completion. This is an advantage in that when the fish takes the bait, the first action of the spring is stronger than when the catch is approaching shallow water or the surface where the tension is eased off by the difference in the tempered spring.

In order to control the reeling-in action, I provide a line-tripped trigger 18 pivotally mounted on the supporting plate and having a loop 19 extending outwardly from its pivotal mounting 20 as shown in Figs. 1, 2, 3, and 4. The line passes from the fixed guide 16 to the trigger loop 19 and, as shown, is offset or out of line with the reel. The trigger 18 is provided with a reel-engaging arm 20 having a slight curve or offset 20' which, in the normal reel-holding position of the trigger, engages an aperture 21 in the supporting plate 10. This arm 20 passes from the outside of the supporting plate 10 through the aperture 21 in position to engage the up-turned ends 15 of the line-carrying arms 14 with the curve or offset 20' to insure holding of the reel until it is unseated by line pull. When the line is reeled off, and the cast made, the trigger will be set in the position shown in Fig. 4, and hold the reel against reeling-in action by the spring 17. Immediately the catch is made, pull on the line will trip the trigger 18, withdraw the arm 20 from engagement with the reel arm 15, and bring it to the full line position shown in Fig. 5, and in the dotted line position shown in Fig. 3, releasing the reel and permitting the spring to start the reeling-in action. This will continue until the catch is made, after which the line and bait may be again cast and the trigger set to hold the spring-tensioned reel in position.

In the form of the invention shown in Figs. 6, 7, and 8, the construction is identical with that heretofore described except that the reel-holding arm 22 is so disposed as to operate through an aperture from the inside of the supporting plate 10 instead of operating from the outside of that supporting plate as described in connection with the form shown in Figs. 1 to 4, inclusive. The action of the trigger 18 under pull of the line is the same as heretofore described, the only difference being that the arm 22 is thrust through an aperture in the supporting plate 10 from the inside instead of from the outside.

In the form of the invention shown in Figs. 9 to 13, inclusive, the same construction is found, except that the trigger 23, which is pivoted on the supporting plate 10 as heretofore described, is provided with a loop 24 engaged by a spring 25 suitably mounted on the supporting plate, as by means of a slotted plate section 26, so as to constantly urge the reel-engaging arm 20 into the aperture 21 to engage the arm 15 on the reel 13. This automatic return of the trigger to reel-holding position, has the advantage that if pull on the line ceases, the trigger and the reel-holding arm will be immediately returned by the spring 25 to their normal reel-restraining position ready to be tripped when pull on the line again takes place.

The reel herein described is automatic in its action when the catch is hooked and the varied tension of the reel spring on the line by reason of differently tempered spring sections becomes effective. The inner and outer spring sections are varied in tension by this difference in tempering so as to provide initially a stronger pull on the line to set the hook in the catch and give a reduced tension on the line as the catch is drawn into shallow water or near the surface, providing an efficient automatically acting reel.

Such changes from the specific constructions here shown for the purpose of illustration as involve only mechanical skill and are comprehended by the appended claims defining the invention, are to be regarded as within the purview of the invention.

I claim:

1. A fishing reel comprising a reel-supporting plate having a closed aperture in its wall, a line-carrying reel rotatably mounted on said plate, a reeling-in spring to rotate said reel, radial arms on said reel movable past the aperture in said supporting plate, a line-tripped trigger pivotally mounted on said supporting plate for pivotal movement around an axis at right angles to the axis of rotation of said reel, and an arm on said trigger normally projecting through the aperture in said supporting plate to engage a radial reel arm and hold the reel against rotation, but retractible from the aperture in a path substantially at right angles to the radial arms on tripping of the trigger under line pull to release said arm and permit reeling-in action of said spring-actuated reel.

2. A fishing reel comprising a reel-supporting plate having a closed aperture in its wall, a line-carrying reel rotatably mounted on said plate, a reeling-in spring to rotate said reel, radial arms on said reel movable past the aperture in said supporting plate, a line-tripped trigger pivotally mounted on said supporting plate for pivotal movement around an axis at right angles to the axis of rotation of said reel, and an arm on said trigger normally projecting through the aperture in said supporting plate and having an offset portion to engage a radial reel arm and hold the reel against rotation, but retractible from the aperture in a path substantially at right angles to the radial arms on tripping of the trigger under line pull to release said arm and permit reeling-in action of said spring-actuated reel.

3. A fishing reel comprising a reel-supporting plate having a closed aperture in its wall, a line-carrying reel rotatably mounted on said plate, a reeling-in spring to rotate said reel, radial arms on said reel movable past the aperture in said supporting plate, a line-tripped trigger pivotally mounted on said supporting plate for pivotal movement around an axis at right angles to the axis of rotation of said reel, and an arm on said trigger disposed exteriorly of said plate and normally projecting through the aperture in said supporting plate to engage a radial reel arm and hold the reel against rotation, but retractible from the aperture in a path substantially at right angles to the radial arms on tripping of the trigger under line pull to release said arm and permit reeling-in action of said spring-actuated reel.

4. A fishing reel comprising a reel-supporting plate having a closed aperture in its wall, a line-carrying reel rotatably mounted on said plate, a reeling-in spring to rotate said reel, radial arms on said reel movable past the aperture in said supporting plate, a line-tripped trigger pivotally mounted on said supporting plate for pivotal movement around an axis at right angles to the axis of rotation of said reel, and an arm on said trigger disposed interiorly of said plate, normally projecting through the aperture in said supporting plate to engage a radial reel arm and hold the reel against rotation, but retractible from the aperture in a path substantially at right angles to the radial arms on tripping of the trigger under line pull to release said arm and permit reeling-in action of said spring-actuated reel.

JOHN W. WHITE, Jr.

REFERENCES CITED

The following references are of record in the file of this patent:

UNITED STATES PATENTS

| Number | Name | Date |
|---|---|---|
| 47,166 | Davis et al. | Apr. 4, 1865 |
| 185,872 | Solomon | Jan. 2, 1877 |
| 321,900 | Joslin | July 7, 1885 |
| 1,023,853 | Kadla | Apr. 23, 1912 |
| 1,272,361 | Bergevin | July 16, 1918 |
| 1,481,722 | Maury | Jan. 22, 1924 |
| 1,501,939 | Brintzenhofe | July 22, 1924 |
| 1,926,452 | Norling | Sept. 12, 1933 |
| 2,303,668 | Tilbury | Dec. 1, 1942 |

FOREIGN PATENTS

| Number | Country | Date |
|---|---|---|
| 388,595 | France | June 4, 1908 |
| 11,061 | France | Oct. 14, 1909 |
| | (Addition to No. 388,595) | |